Sept. 30, 1958 G. M. RAPATA 2,853,913
PLASTIC DRIVE FASTENER HAVING A RADIALLY
COLLAPSIBLE WORK ENGAGING SHOULDER
Filed May 5, 1954 2 Sheets-Sheet 2
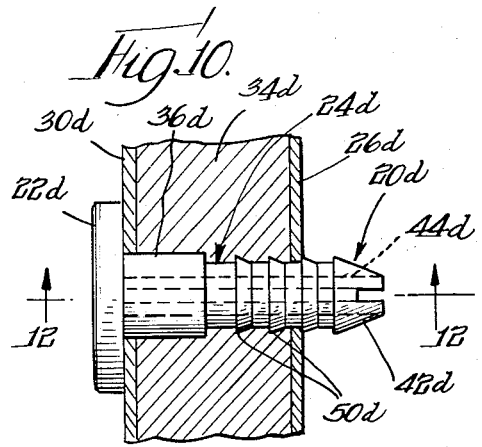
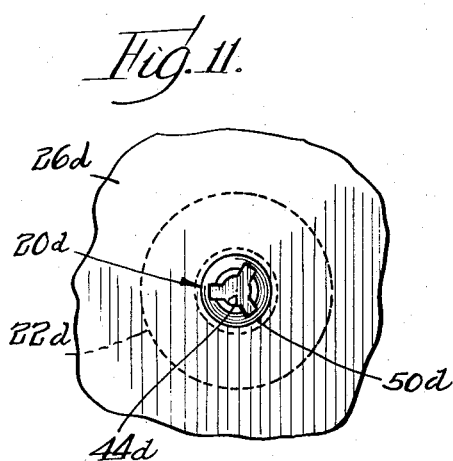
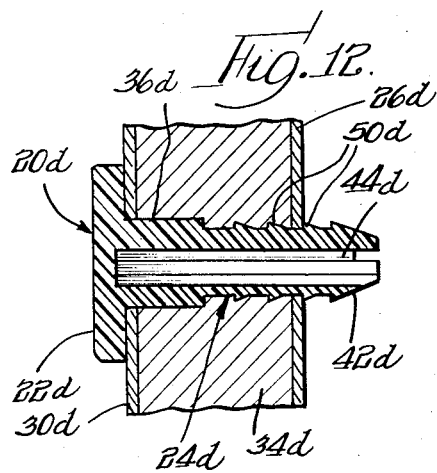
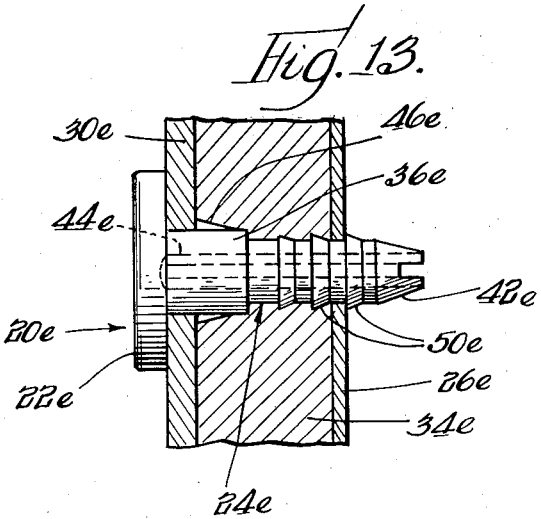
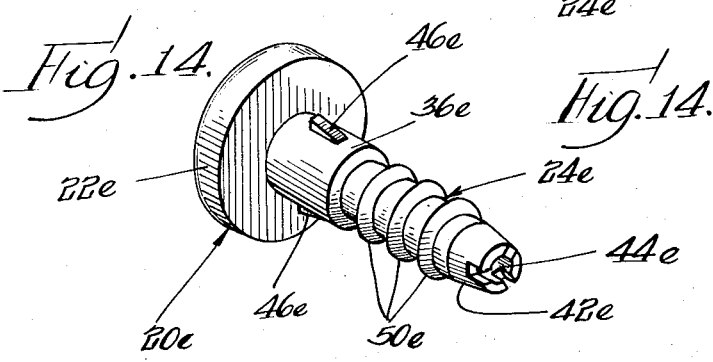
INVENTOR.
George M. Rapata
BY Olson & Trexler
Attys.

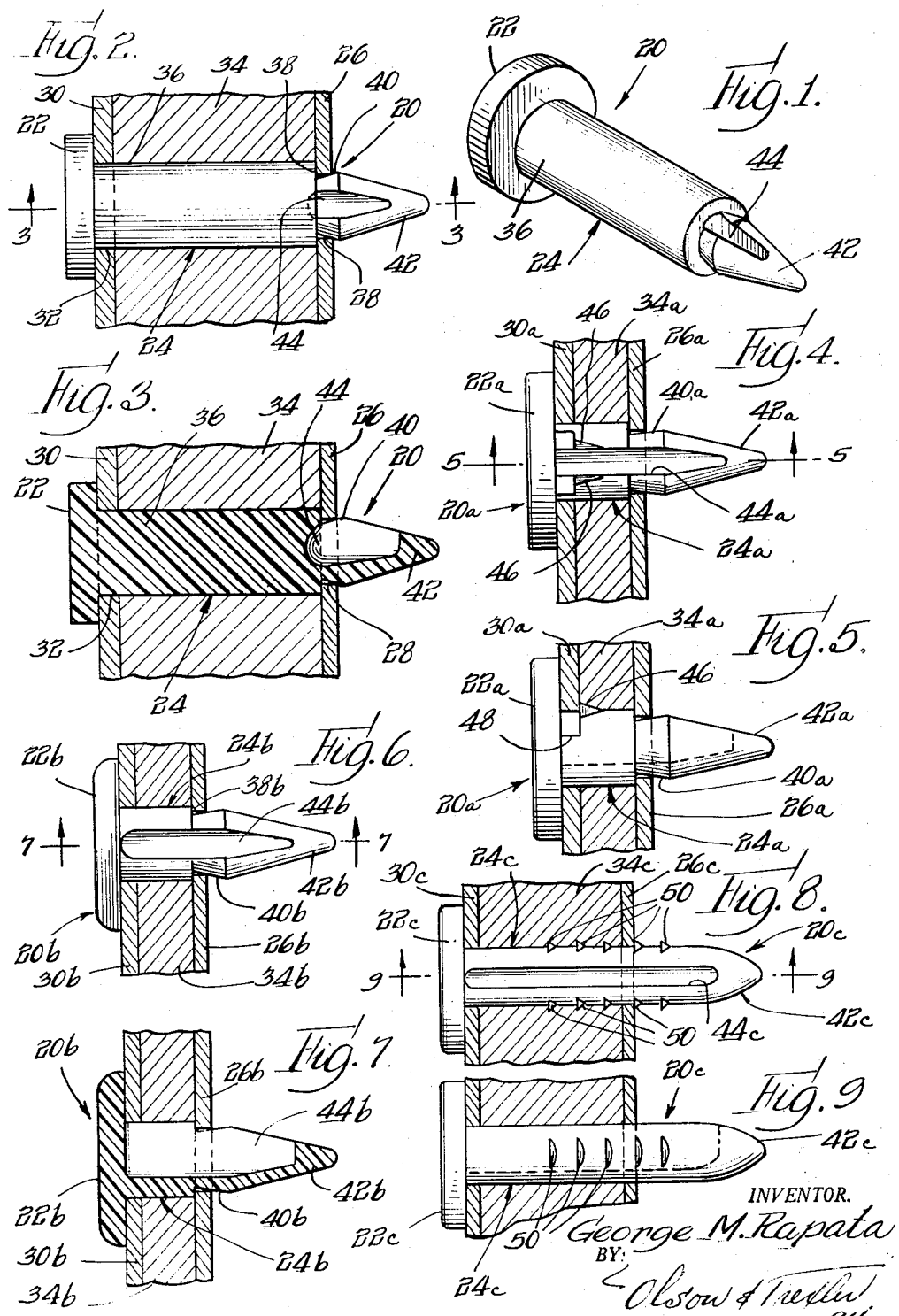

United States Patent Office 2,853,913
Patented Sept. 30, 1958

2,853,913

PLASTIC DRIVE FASTENER HAVING A RADIALLY COLLAPSIBLE WORK ENGAGING SHOULDER

George M. Rapata, Chicago, Ill., assignor to Illinois Tool Works, Chicago, Ill., a corporation of Illinois Application May 5, 1954, Serial No. 427,829

4 Claims. (Cl. 85—5)

The present invention relates to a novel fastening device and more particularly to a novel drive fastener adapted to retain a plurality of apertured workpieces together.

Fire wall structures of automobiles and the like usually include a pair of spaced panels with a layer of fibrous insulating material such as jute or fiber glass therebetween. This structure, has, in the past, generally been retained together by utilizing a plurality of metal fasteners passed through aligned openings in the panels. However, such metal fasteners have not been entirely satisfactory since they have been unduly difficult and expensive to manufacture and since they are subject to corrosion. Another disadvantage of such metal fasteners is that they do not effectively seal the apertures in the panels so that fumes and the like may pass from the engine compartment and into the passenger compartment. It is therefore, an object of the present invention to provide a novel one piece plastic fastener capable of overcoming the above mentioned disadvantages of heretofore known metal fasteners.

More specifically, it is an object of the present invention to provide a novel one piece plastic fastener for securing a plurality of apertured workpieces or panels together, which novel fastener may be relatively easily and economically manufactured and quickly applied to the workpieces.

Another object of the present invention is to provide a novel one piece plastic fastener of the above described type which effectively seals an aperture in a workpiece to prevent the passage of fumes, moisture, dirt and the like therethrough.

A further object of the present invention is to provide a novel one piece plastic fastener for retaining the elements of a fire wall structure together, which fastener is formed so that it may be easily passed through the insulating material between the spaced panels of the fire wall structure.

Still another object of the present invention is to provide a novel one piece plastic fastener of the above described type which is securely retained in assembled relationship with a pair of apertured panels or workpieces and which may be utilized for connecting panels that are spaced apart different amounts.

Other objects and advantages of the present invention will become apparent from the following description and the accompanying drawings wherein:

Fig. 1 is a perspective view of a fastener embodying the principles of this invention;

Fig. 2 is a partial cross sectional view showing the fastener of Fig. 1 applied to a structure such as a fire wall of an automobile;

Fig. 3 is a cross sectional view taken along line 3—3 in Fig. 2;

Fig. 4 is a partial cross sectional view similar to Fig. 2 but showing a modified form of the present invention;

Fig. 5 is a partial cross sectional view taken along line 5—5 in Fig. 4;

Fig. 6 is a partial cross sectional view similar to Fig. 2 but showing another modified form of the present invention;

Fig. 7 is a cross sectional view taken along line 7—7 in Fig. 6;

Fig. 8 is a partial cross sectional view showing a further modified form of the present invention;

Fig. 9 is a partial cross sectional view taken along line 9—9 in Fig. 8;

Fig. 10 is a partial cross sectional view showing still another modified form of the present invention;

Fig. 11 is an end view of the structure shown in Fig. 10;

Fig. 12 is a cross sectional view taken along line 12—12 in Fig. 10;

Fig. 13 is a partial cross sectional view showing still another modified form of the present invention; and Fig. 14 is a perspective view of the novel fastener shown in Fig. 13.

Referring now more specifically to the drawings wherein like parts are designated by the same numerals throughout the various figures, a fastener 20 embodying the principles of the present invention is shown in Figs. 1, 2 and 3. The fastener 20 as well as the fasteners of the other embodiments of the present invention which will be described below are in the form of a single piece of molded plastic material having the desired resiliency, such as nylon or polyethylene. The fastener 20 includes a solid imperforate head 22 and a shank 24 extending axially therefrom. The head may be of any desired external configuration and also can be formed to fit into and retain a molding strip or the like, not shown.

As shown best in Figs. 2 and 3 the fastener 20 is adapted to be assembled with a work structure which may, for example, be the fire wall of an automobile. Such a work structure or fire wall includes a fixed panel 26 having an aperture 28 therethrough, a removable liner panel 30 having an aperture 32 in alignment with the aperture 28 and a mat 34 of insulating material such as jute or fiber glass disposed between the panels. With the fastener in assembled position it is seen that the head 22 abuts against the outer surface of the panel 30 and closes the opening 32. In addition, the shank 24 of the fastener is provided with a portion 36 adjacent the head which portion has an uninterrupted peripheral surface and a diameter substantially equal to the diameter of the aperture 32. Thus, the shank portion 36 in combination with the imperforate head 22 serves to substantially seal the aperture 32 so as to prevent the passage of air, dirt, gas fumes and the like therethrough. This sealing feature of the fastener 20 is of particular importance when the fastener is used in combination with a fire wall of an automobile or the like since it is, of course, undesirable to permit engines fumes to pass from the engine compartment into the passenger compartment of the automobile. Adjacent the free end of the shank 24 the diameter thereof is reduced to provide a radially extending wall 38 adapted to abut the inner surface of the panel 26. From the wall 38 the shank flares outwardly to provide shoulder means 40 engageable with an outwardly facing surface or edge of the panel 26 so that this panel is securely retained between the shoulder means and the wall 38. With this structure the fastener is accurately positioned with respect to the fixed panel 26 and the head of the fastener serves to maintain a predetermined maximum space between the panel 26 and the panel 30.

In order to facilitate application of the fastener 20 to the wall structure, the shank 24 is provided with a solid inwardly tapering or pointed free end portion 42 which may easily be driven through the mat of insulating material and which also serves to guide the shank through the aperture 28 in the panel 26. In addition, the shank is provided with a longitudinally extending recess or slot 44 which serves to increase the inherent resiliency of the shank so that the shank may be collapsed sufficiently to allow the shoulder means 40 to pass through the aperture 28. It will be appreciated that the tapering end portion 42 of the shank also serves as cam means which is engageable with the wall of the aperture 28 during application of the fastener for causing collapsing of the shank until the shoulder means 40 has passed through the aperture, whereupon the resiliency of the plastic material of the shank biases the shoulder means against the outwardly facing surface or edge of the panel 26.

In Figs. 4 and 5 there is shown a structure which is similar to the structure illustrated in Figs. 1 through 3 as indicated by the application of identical numerals with the suffix $a$ add to the corresponding elements. In this embodiment the slot or recess 44a extends to the imperforate head 22a to provide the shank with the desired resiliency since, as shown in the drawings, the shank 24a is relatively shorter than the shank 24. In addition, shoulders or lugs 46 are formed on the shank for engaging the inner surface of the panel 30a and holding the imperforate head 22a in tight substantially sealing engagement with the outer surface of the panel. If desired, the shank may be further recessed as indicated at 48 to increase the resiliency thereof adjacent the shoulders or lugs 46 whereby to facilitate insertion of the lugs through the aperture in the panel 30a.

Figs. 6 and 7 illustrate an embodiment of the present invention which is similar to the embodiment shown in Figs. 4 and 5 as indicated by the application of identical reference numerals with the suffix $b$ added to corresponding elements. This embodiment differs in that the lugs or shoulders 46 have been eliminated. However, the imperforate head 22b is still retained against the outer surface of the panel 30b by the shoulder means 40b so as to seal the opening in the panel 30b sufficiently for some installations.

Figs. 8 and 9 illustrate a structure including a fastener 20c which is generally similar to the above described fastener 20b as shown by the application of identical reference numerals with the suffix $c$ added to corresponding parts. The fastener 20c differs in that the shank 24c is preferably formed so that it is the same size throughout its length except for the inwardly tapered or pointed solid end portion 42c. In addition, a series of shoulders or lugs 50 are arranged along opposite sides of the shank 24c for engaging the outer surface of the panel 26c. With this structure the fastener 22c may be utilized for securing panels which are spaced different distances apart.

Referring now to Figs. 10, 11 and 12 it is seen that the present invention has provided a fastener 20d which is similar to the above described fasteners as indicated by the application of identical reference numerals with the suffix $d$ added to corresponding elements. More specifically, it is seen that the fastener 20d is provided with an imperforate head 22d and an uninterrupted shank portion 36d similar to the corresponding elements of the fastener 20 for sealing the opening in the panel 30d, and the shank 24d is provided with a series of axially spaced shoulders 50d which function in a manner similar to the corresponding elements in the embodiment of Figs. 8 and 9. It should be noted that the shoulders include an inclined surface generally facing the free end of the shank to cam the shoulders inwardly during application of the fastener to the work and that the shoulders 50d completely encircle the shank so as to increase their strength and holding power. In addition, it should be noted that the recess 44d in the shank 24d is in the form of a centrally located bore having one end closed by the imperforate head 22d and having its opposite end opening through the inwardly tapering or pointed end portion 42d. This arrangement of the recess has the advantage that engine fumes and the like cannot pass therethrough into the space between the panels 26d and 30d so that the fastener as a whole is more effective to seal the apertures in the panels against the passage of such fumes.

In Figs. 13 and 14 there is shown a fastener 20e which is essentially identical to the above described fastener 20d as indicated by the application of identical reference numerals to identical elements. In addition, the fastener 20e includes a plurality of shoulders or lugs 46e which are similar to the corresponding shoulders or lugs of the embodiments shown in Figs. 4 and 5. With this structure the head 22e is held tightly against the panel 30e so that maximum sealing of apertures through the panels may be obtained with the fastener 20e.

From the above description it is seen that the present invention has provided a novel one piece plastic fastener which is fully capable of accomplishing the objects heretofore set forth. More specifically, it is seen that the present invention has provided a novel one piece plastic fastener which is of simple and economical construction and which may readily be applied to the work. In addition, it is seen that the novel fastener of the present invention is formed so that it is effective to seal the apertures through the work against the passage of fumes and the like. Furthermore, it is seen that the novel fasteners of the present invention have been formed so that they may readily be inserted through a wall structure of the type described and they have been provided with shoulder means so that they are effective to retain spaced work pieces or panels in predetermined relationship.

While the preferred embodiments of the present invention have been shown and described herein it is obvious that many structural details may be changed without departing from the spirit and scope of the appended claims.

The invention is claimed as follows:

1. A one-piece molded plastic fastener comprising a head, and a substantially rigid shank extending axially from said head and adapted to be driven through a work structure, said head being located at one end of said shank and including a clamping surface facing in the direction of and extending radially beyond the shank for engagement with one surface of a work structure, a first portion of said shank adjacent the head having a predetermined maximum transverse cross section providing a transverse shoulder spaced a predetermined substantial distance from the head facing in the same direction as the clamping surface of the head and adapted for engagement with a work structure at said predetermined distance from the head, a remaining portion toward the entering end of said shank being of smaller cross section than the predetermined transverse cross section of the first portion of the shank, said shank portion of smaller cross section including outward substantially rigid shoulder means spaced from and generally opposing the said shoulder on the first shank portion for engaging the work structure in opposition to said first mentioned shoulder, the shoulder means on the shank portion of smaller cross section projecting radially from the shank axis to a lesser extent than the shoulder provided on the first shank portion, the entering end portion of the shank portion of smaller cross section tapering generally from said shoulder means and terminating in an entering imperforate nose portion facilitating initial insertion of the shank through the work structure, and said shank having a relatively deep radial recess with the ends thereof terminating between the nose portion and said head and opening outwardly at least through said shoulder means to permit inward collapsing of the said shoulder means by relative closing of said recess during insertion of the shank through the work structure.

2. A one-piece molded plastic fastener as claimed in claim 1, wherein the shoulder means comprises a surface flaring outwardly from the shoulder on the first shank portion.

3. A one-piece molded plastic fastener as claimed in claim 1, wherein said recess extends substantially the entire length of the shank.

4. A one-piece molded plastic fastener as claimed in claim 3, wherein there is provided a shoulder projection on the shank adjacent and in opposition to the clamping surface of the head, said shoulder projection being inwardly collapsible by relative closing of said recess during insertion of the shank through the work structure.

References Cited in the file of this patent

UNITED STATES PATENTS

| | | |
|---|---|---|
| 170,190 | Pratt | Nov. 23, 1875 |
| 204,913 | Pratt | June 18, 1878 |
| 908,876 | Monaghan | Jan. 5, 1909 |
| 916,995 | Carr | Apr. 6, 1909 |
| 982,078 | Link | Jan. 17, 1911 |
| 1,111,513 | Woodard | Sept. 22, 1914 |
| 1,204,688 | Rude | Nov. 14, 1916 |
| 1,287,678 | Hall | Dec. 17, 1918 |
| 1,830,460 | Berge | Nov. 3, 1931 |
| 1,915,249 | Jorgensen | June 20, 1933 |
| 1,978,087 | Johnson | Oct. 23, 1934 |
| 2,006,813 | Norwood | July 2, 1935 |
| 2,110,959 | Lombard | Mar. 15, 1938 |
| 2,126,482 | Lombard | Aug. 9, 1938 |
| 2,319,058 | Hansman | May 11, 1943 |
| 2,442,754 | Beam | June 8, 1948 |
| 2,713,284 | Bedford | July 19, 1955 |